UNITED STATES PATENT OFFICE.

JOHN LIGHTFOOT, OF BURNLEY, ENGLAND, ASSIGNOR TO J. J. MÜLLER PACK.

IMPROVEMENT IN DYEING AND PRINTING TEXTILE FABRICS AND YARNS WITH ANILINE BLACK.

Specification forming part of Letters Patent No. 38,589, dated May 19, 1863; reissue No. 4,746, dated February 6, 1872.

DIVISION A.

*To all whom it may concern:*

Be it known that JOHN LIGHTFOOT, formerly of Accrington, but now of Lower House, Burnley, in the county of Lancaster and Kingdom of England, chemist, invented or discovered new and useful Improvements in Dyeing and Printing Textile Fabrics and Yarns; whereof a full and exact description is herein set forth.

Prior to the date of this invention a variety of colors, other than black, derived from aniline had been utilized in dyeing or printing textile fabrics or yarns.

By this invention aniline is made available for the production or development of a black color, dye, or stain in textile fabrics and yarns, more especially those composed of vegetable fibers.

For dyeing fabrics or yarns so as to develop therein an aniline black, there is taken one gallon of water, and in it are dissolved four ounces of chlorate of potash. To this are added eight ounces of aniline previously combined with eight ounces of hydrochloric acid at 32° Twaddell. After stirring well there are added one pint of acetic acid and eight ounces' measure of perchloride of copper at 88° Twaddell. Then are added four ounces of sal-ammoniac, or an equivalent quantity of other suitable alkaline chloride.

The fabric or yarn is steeped in this solution, wrung out and dried, and then exposed in a room at from 60° to 70° Fahrenheit for two or three days. After which, for the purpose of raising the black then developed, the goods are passed through water alone, or water containing in solution an alkaline salt, or an alkali, or alkaline earth, such as caustic soda, caustic potash, caustic ammonia, or caustic lime.

For printing fabrics or yarns so as to develop therein an aniline black, there is taken one gallon of suitable thickening—such as starch-paste, containing one pound weight of starch per gallon—and in it are dissolved four ounces of chlorate of potash and eight ounces of aniline previously combined with eight ounces of hydrochloric acid. There are then added four ounces' measure of perchloride of copper at 88° Twaddell and two ounces of sal-ammoniac, or an equivalent quantity of other suitable alkaline chloride.

After printing this color mixture it is aged for three nights, and the black resulting therefrom is then raised, in water alone or in a weak solution of alkali or soap, as before mentioned; or the goods may be passed, after printing and aging, through a box containing rollers and supplied with "ammoniacal gas," which is preferred when this color mixture for producing the black is printed along with "steam colors" prior to steaming the goods; and when it is printed along with "madder" or "garancine" colors they are aged or exposed in a room at from 60° to 70° Fahrenheit for three days, then put through the "ammoniacal gas" and dunged, dyed, washed, and passed through a solution of soap, whereby an intense black is produced.

The metallic salt is not confined to perchloride of copper, as sulphate of copper and many other salts of copper will produce the same result; and the use of alkaline chlorides can be dispensed with when such a metallic salt as chloride of copper is employed. The soluble salts of iron may also be substituted for those of copper in preparing the dyeing or printing material for producing the black.

In some cases the cloth is padded in a solution of any of the metallic salts named, either separately or mixed together, dried and printed, or padded with a thickened salt of aniline mixed with chlorate of potash, aged three to four nights, and finished as previously stated; or the cloth is padded in a solution of any of the metallic salts named as before; then the oxide of the metal or metals used is precipitated into the cloth by passing it through a solution of alkali suitable for that purpose; after which the cloth is washed, dried, and printed, or padded with a thickened acid salt of aniline mixed with chlorate of potash, aged three to four nights, and finished as before specified.

The aniline black thus developed possesses peculiar properties which distinguish it from all other blacks before produced in textile fabrics or yarns, and it is especially characterized by its power of resisting chemical reagents.

What is claimed is—

The use of a salt or salts of aniline for producing or developing a black color, dye, or stain in textile fabrics or yarns, substantially as described.

J. J. MÜLLER PACK.

Witnesses:

H. SALATHÉ,

V. SPRENGER.